(12) United States Patent
Park et al.

(10) Patent No.: US 9,103,995 B2
(45) Date of Patent: Aug. 11, 2015

(54) FIELD TERMINABLE OPTICAL FIBER CONNECTOR WITH SPLICE ELEMENT

(71) Applicant: 3M INNOVATIVE PROPERTIES COMPANY, St. Paul, MN (US)

(72) Inventors: Chansool Park, Seoul (KR); Donald K. Larson, Cedar Park, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/465,433

(22) Filed: Aug. 21, 2014

(65) Prior Publication Data

US 2014/0363130 A1    Dec. 11, 2014

Related U.S. Application Data

(63) Continuation of application No. 14/066,370, filed on Oct. 29, 2013, now Pat. No. 8,840,320, which is a continuation of application No. 12/990,520, filed as application No. PCT/US2009/044073 on May 15, 2009, now Pat. No. 8,573,859.

(60) Provisional application No. 61/059,433, filed on Jun. 6, 2008.

(51) Int. Cl.
G02B 6/38    (2006.01)

(52) U.S. Cl.
CPC ............ *G02B 6/3887* (2013.01); *G02B 6/3846* (2013.01); *G02B 6/3821* (2013.01)

(58) Field of Classification Search
None
See application file for complete search history.

(56) References Cited

U.S. PATENT DOCUMENTS

| | | |
|---|---|---|
| 4,155,624 A | 5/1979 | Logan |
| 4,588,256 A | 5/1986 | Onstott |
| 4,795,229 A | 1/1989 | Abendschein et al. |
| 4,824,197 A | 4/1989 | Patterson |
| 4,863,235 A | 9/1989 | Anderson |
| 4,892,378 A | 1/1990 | Zajac |
| 5,102,212 A | 4/1992 | Patterson |
| 5,138,681 A | 8/1992 | Larson |

(Continued)

FOREIGN PATENT DOCUMENTS

| | | |
|---|---|---|
| JP | 60-250312 A | 12/1985 |
| JP | 04-212112 A | 8/1992 |

(Continued)

OTHER PUBLICATIONS

Report to Small & Medium Business Administration of South Korea by Network Cable Co. Ltd. Connector, "Development of Connection Measuring System of Non-Fusion Splicing Optical Connector", Oct. 30, 2007.

(Continued)

*Primary Examiner* — Tina Wong
(74) *Attorney, Agent, or Firm* — Gregg H. Rosenblatt

(57) ABSTRACT

An optical fiber connector includes a housing configured to mate with a receptacle, a collar body that includes a fiber stub and a mechanical splice device, a backbone to retain the collar body within the housing, and a boot. The backbone includes a fiber jacket clamping portion to clamp a jacket portion that surrounds a portion of the terminated optical fiber upon actuation. The boot actuates the fiber jacket clamping portion of the backbone upon attachment to the backbone. The optical fiber connector can be terminated in the field without the need to use a separate termination platform or tool.

4 Claims, 7 Drawing Sheets

(56) References Cited

U.S. PATENT DOCUMENTS

| | | |
|---|---|---|
| 5,155,787 A | 10/1992 | Carpenter |
| 5,159,653 A | 10/1992 | Carpenter |
| 5,185,148 A | 2/1993 | Michaels |
| 5,185,844 A | 2/1993 | Bensel, III |
| 5,321,784 A | 6/1994 | Cubukciyan |
| 6,019,521 A | 2/2000 | Manning |
| 6,302,596 B1 | 10/2001 | Cohen |
| 6,796,722 B2 | 9/2004 | Mleczko |
| 7,011,454 B2 | 3/2006 | Caveney |
| 7,178,990 B2 | 2/2007 | Caveney |
| 7,204,644 B2 | 4/2007 | Barnes |
| 7,280,733 B2 | 10/2007 | Larson |
| 7,369,738 B2 | 5/2008 | Larson |
| 7,393,148 B2 | 7/2008 | Allen |
| 7,785,017 B2 | 8/2010 | Barnes |
| 8,573,859 B2 * | 11/2013 | Larson et al. .............. 385/86 |
| 8,840,320 B2 * | 9/2014 | Park et al. .............. 385/86 |
| 2003/0224657 A1 | 12/2003 | Malloy |
| 2005/0213892 A1 | 9/2005 | Barnes |
| 2005/0244108 A1 | 11/2005 | Billman |
| 2006/0072884 A1 | 4/2006 | Yamauchi |
| 2006/0269209 A1 | 11/2006 | Mullaney |
| 2007/0104425 A1 | 5/2007 | Larson |
| 2007/0127872 A1 | 6/2007 | Caveney |
| 2010/0098381 A1 | 4/2010 | Larson |

FOREIGN PATENT DOCUMENTS

| | | |
|---|---|---|
| JP | 06-018746 A | 1/1994 |
| JP | 3445479 | 6/2003 |
| KR | 10-0320389 B1 | 9/2005 |
| KR | 10-0636442 B1 | 10/2006 |
| KR | 10-0724076 B1 | 5/2007 |
| KR | 10-0821298 B1 | 4/2008 |
| WO | WO 2006/019515 | 2/2006 |
| WO | WO 2006/019516 | 2/2006 |
| WO | WO 2008/013767 | 1/2008 |

OTHER PUBLICATIONS

Publication: "Field Assembly Optical Connector", WINI Technology Co. Ltd., Jan. 16, 2008.

* cited by examiner though it is a continuation of U.S. patent application Ser. No. 14/066,370, now allowed, which is a continuation of U.S. patent application Ser. No. 12/990,520, filed Nov. 1, 2010, now U.S. Pat. No. 8,573,859, which is a national stage filing under 35 U.S.C. 371 of PCT/US2009/044073, filed May 15, 2009, which claims priority to U.S. Provisional Application No. 61/059,433, filed Jun. 6, 2008, the disclosures of which are incorporated by reference in their entirety herein.

FIELD TERMINABLE OPTICAL FIBER CONNECTOR WITH SPLICE ELEMENT

CROSS REFERENCE TO RELATED APPLICATIONS

This application is a continuation of U.S. patent application Ser. No. 14/066,370, now allowed, which is a continuation of U.S. patent application Ser. No. 12/990,520, filed Nov. 1, 2010, now U.S. Pat. No. 8,573,859, which is a national stage filing under 35 U.S.C. 371 of PCT/US2009/044073, filed May 15, 2009, which claims priority to U.S. Provisional Application No. 61/059,433, filed Jun. 6, 2008, the disclosures of which are incorporated by reference in their entirety herein.

BACKGROUND

1. Field of the Invention

The present invention is directed to an optical fiber connector.

2. Related Art

Mechanical optical fiber connectors for the telecommunications industry are known. For example, LC, ST, FC, and SC optical connectors are widely used.

However, commercially available optical fiber connectors are not well suited for field installations. Typically, an adhesive is required to mount these types of connectors on to an optical fiber. This process can be awkward and time consuming to perform in the field. Also post-assembly polishing requires that the craftsman have a higher degree skill.

Also known are hybrid optical fiber splice connectors, as described in JP Patent No. 3445479, JP Application No. 2004-210251 (WO 2006/019516) and JP Application No. 2004-210357 (WO 2006/019515). However, these hybrid splice connectors are not compatible with standard connector formats and require significant piecewise assembly of the connector in the field. The handling and orientation of multiple small pieces of the connector can result in incorrect connector assembly that may either result in decreased performance or increase the chance of damaging the fiber.

More recently, U.S. Pat. No. 7,369,738 describes an optical fiber connector that includes a pre-polished fiber stub disposed in ferrule that is spliced to a field fiber with a mechanical splice. Such a connector, called an NPC, is now commercially available through 3M Company (St. Paul, Minn.).

SUMMARY

According to a first aspect of the present invention, an optical fiber connector for terminating an optical fiber is provided. The optical fiber connector includes a housing configured to mate with a receptacle. The optical fiber connector also includes a collar body disposed in the housing, wherein the collar body includes a fiber stub disposed in a first end portion of the collar body. The fiber stub includes a first optical fiber mounted in a ferrule and has a first end proximate to an end face of the ferrule and a second end. The collar body further includes a mechanical splice device disposed in a portion of the collar body, where the mechanical splice device is configured to splice the second end of the fiber stub to a second optical fiber. The optical fiber connector also includes a backbone to retain the collar body within the housing, the backbone including a fiber jacket clamping portion to clamp a jacket portion that surrounds a portion of the second optical fiber upon actuation. The optical fiber connector also includes a boot attachable to a portion of the backbone, wherein the boot actuates the fiber jacket clamping portion of the backbone upon attachment to the backbone.

According to another aspect of the present invention, a method for terminating an optical fiber in an optical connector is provided.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
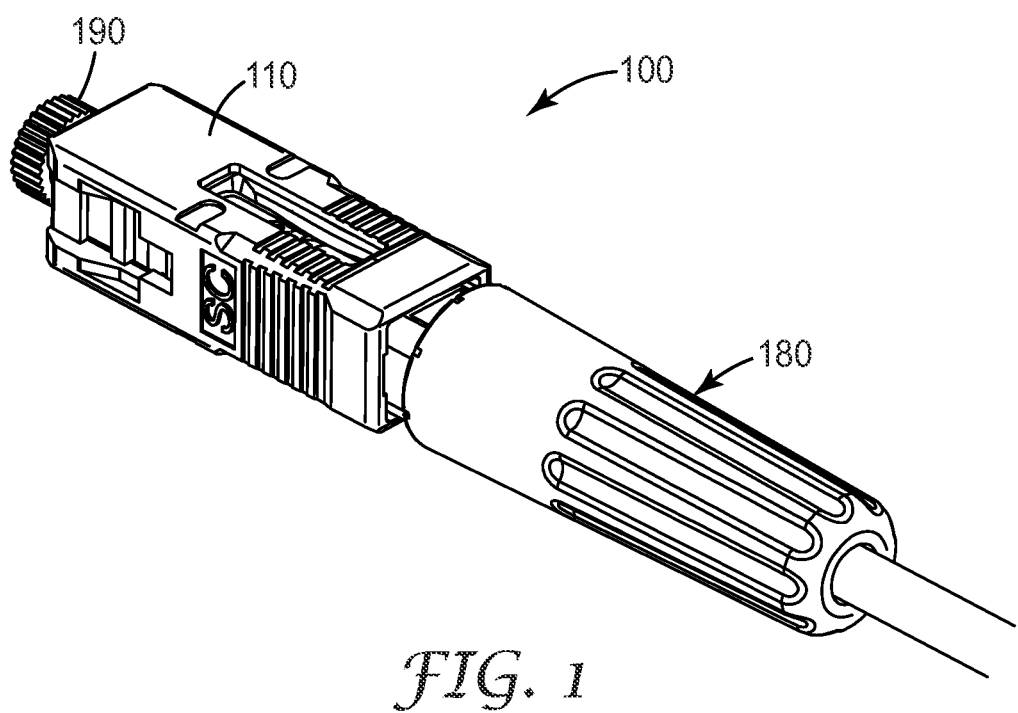
FIG. 1 is an isometric view of an optical fiber connector according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

The present invention is directed to an optical fiber connector. In particular, the optical fiber connector of the exemplary embodiments is of compact length and is capable of straightforward field termination. Further, the straightforward field termination can be accomplished without the use of a connector termination platform or separate crimping tool. The exemplary connector(s) described herein can be readily installed and utilized for Fiber To The Home (FTTH) and/or Fiber To The X (FTTX) network installations. The exemplary connector(s) can be utilized in installation environments that require ease of use when handling multiple connections, especially where labor costs are more expensive.

Figure 2:
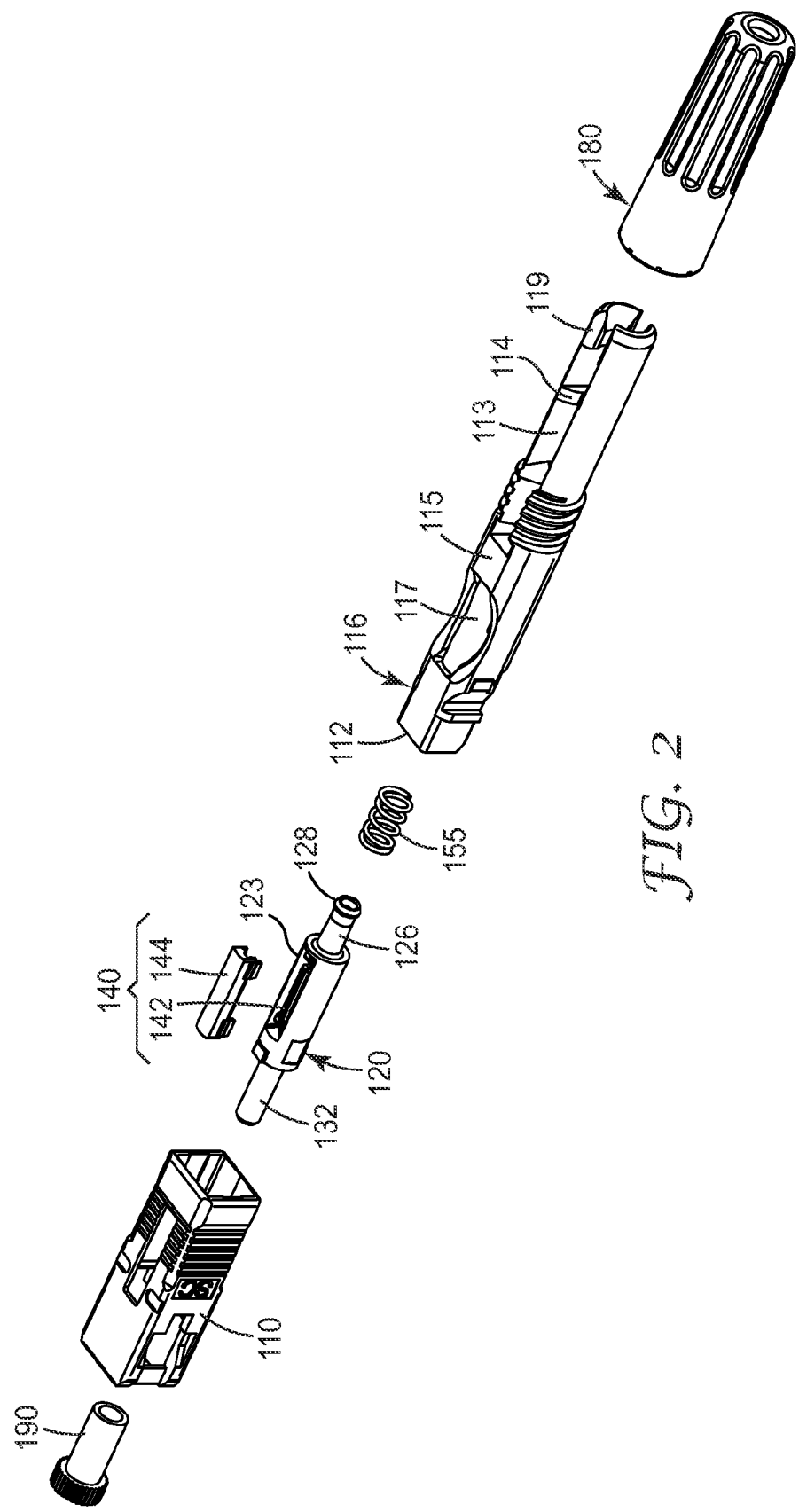
FIG. 2 is an exploded view of an optical fiber connector according to an embodiment of the present invention.
Figure 3:
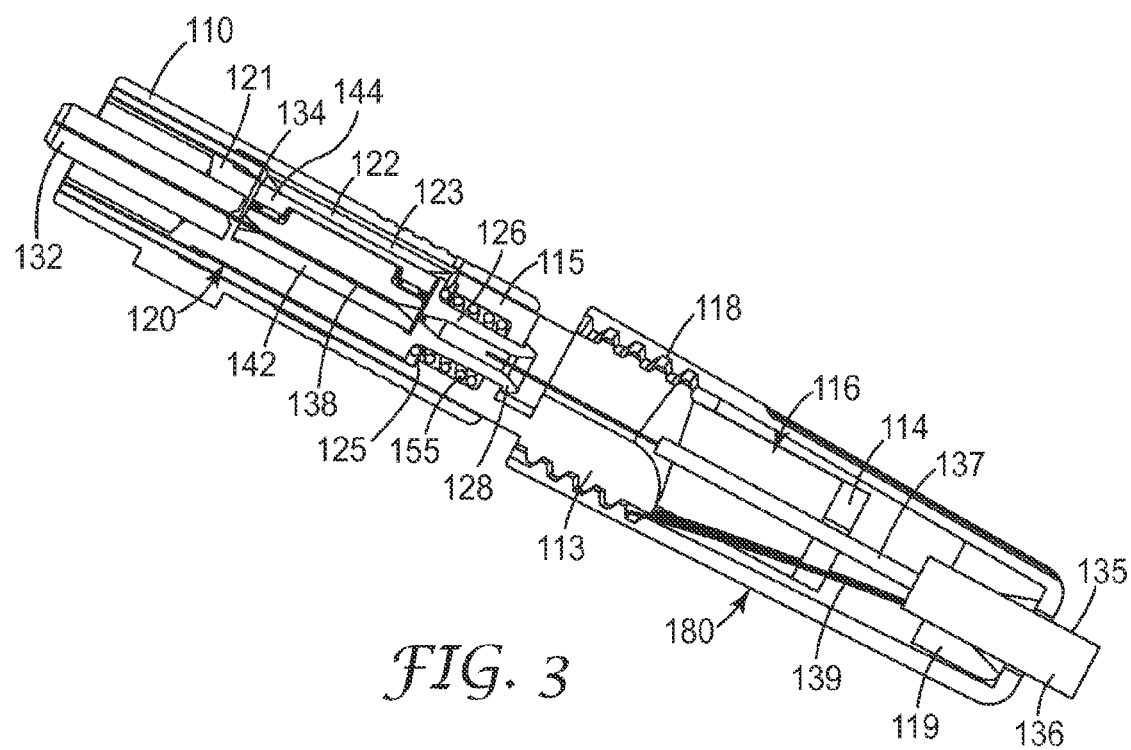
FIG. 3 is a schematic cross-sectional view of an optical fiber connector according to an embodiment of the present invention.
Figure 4:
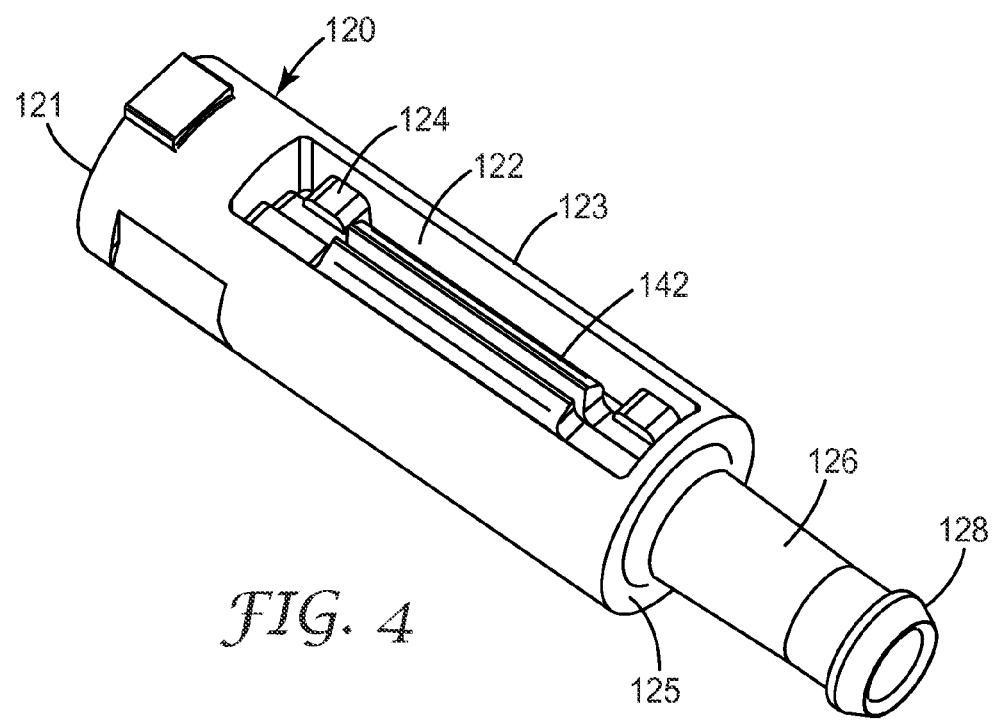
FIG. 4 is an isometric view of an exemplary collar body of an optical fiber connector according to an embodiment of the present invention.
Figure 5:
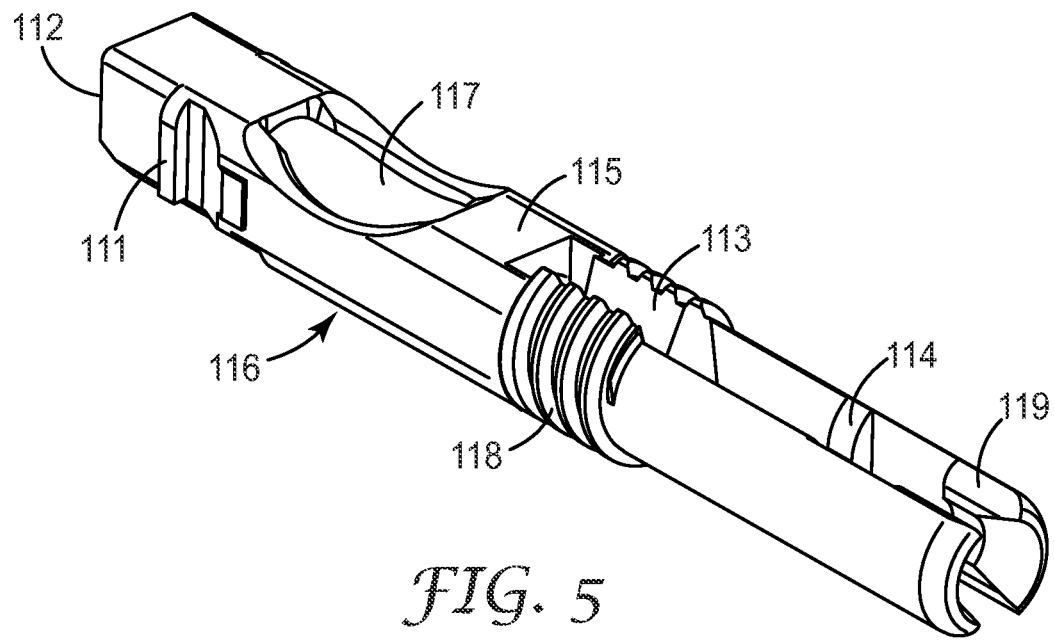
FIG. 5 is an isometric view of an exemplary backbone of an optical fiber connector according to an embodiment of the present invention.
Figure 6:
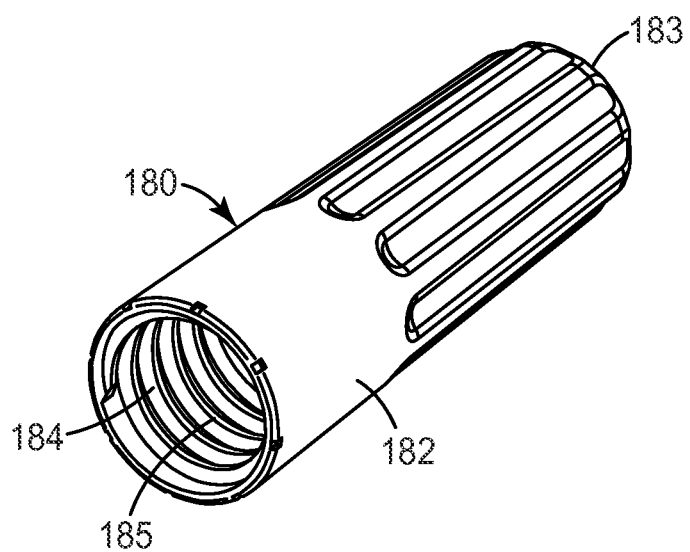
FIG. 6 is a side view of an exemplary boot of an optical fiber connector according to an embodiment of the present invention.

According to an exemplary embodiment of the present invention, an optical fiber connector 100 is shown in isometric view in FIG. 1. The components of the optical fiber connector are shown in an exploded view in FIG. 2. FIG. 3 shows a section view of the optical fiber connector 100. FIGS. 4-6 show close up views of elements of the optical fiber connector, including the collar body 120, the backbone 116, and the boot 180.

Optical connector 100 is configured to mate with a receptacle of a corresponding format. For example, as shown in FIG. 1, exemplary optical connector 100 is configured as having an SC format. However, as would be apparent to one of ordinary skill in the art given the present description, optical connectors having other standard formats, such as ST, FC, and LC connector formats, can also be provided.

As shown in FIG. 1, SC-type optical fiber connector 100 can include a connector body having a housing 110 and a fiber boot 180. A cap 190 can be placed at the front end of the connector to protect the stub fiber end when not in use.

Connector 100 includes a housing 110 having an outer shell configured to be received in an SC receptacle (e.g., an SC coupling, an SC adapter, or an SC socket). As shown in FIG. 2, connector 100 also includes a collar body 120 (which can also be referred to as a barrel) to house a ferrule and a splice device, a multi-purpose backbone 116 that retains the collar body 120 within the connector, and a boot 180.

In this exemplary embodiment, connector 100 can be utilized to terminate a field optical fiber cable 135. Optical fiber cable 135 is a jacketed cable that includes an outer jacket 136, a coated portion 137 (e.g., with a buffer coating or the like), a fiber portion 138 (e.g., the bare clad/core), and strength members 139. In a preferred aspect, the strength members 139 comprise aramid, Kevlar, or polyester yarn or strands disposed between an inner surface of the fiber jacket 136 and an outer surface of coated portion 137. Optical fiber cable 135 can be a standard cylindrically shaped cable structure or it can be an alternatively shaped structure, such as a rectangular-shaped cable.

In one aspect, the backbone 116 provides structural support for the connector 100. In a further aspect, the backbone 116 is an elongated structure (having a length of from about 50 mm to about 60 mm) that also provides clamping for the optical fiber being terminated in the field. Moreover, the backbone 116 can provide further axial strain relief by providing a clamping surface for the strength members of the optical fiber being terminated.

Figure 7A:
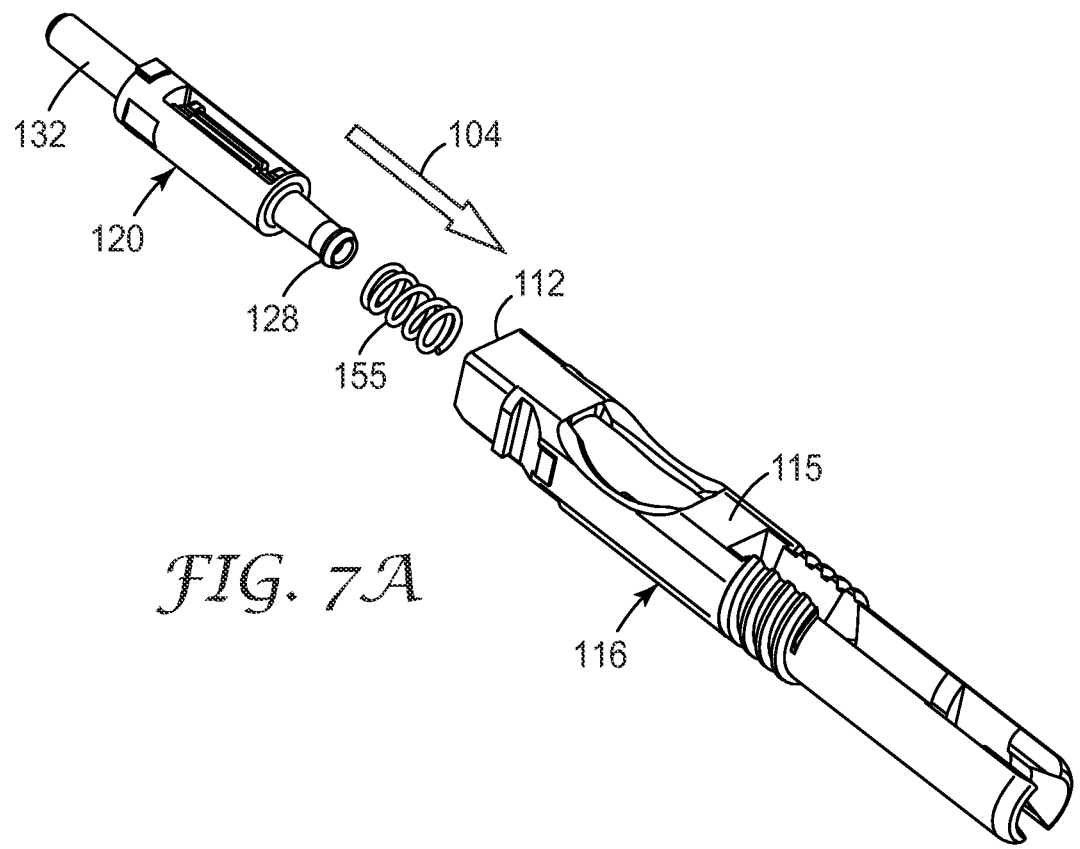
FIGS. 7A-7F show isometric views of the optical fiber connector during different stages of an exemplary field termination process according to another embodiment of the present invention.

Backbone 116 includes an opening 112 at a front end to allow for insertion of the collar body 120 (see e.g., FIG. 7A). Backbone 116 further includes an access opening 117, which can provide access to actuate a mechanical splice device disposed within the connector collar body. In a preferred aspect, as is shown in FIG. 5, access opening 117 can have a cut-out or shallow depression formed on the sides to accommodate a user's thumb or finger during actuation of the splice device. The backbone 116 has an axial bore throughout to permit passage of the optical fiber being terminated. As is also shown in more detail in FIG. 5, backbone 116 can further include a mounting structure 118 that provides for coupling to the fiber boot 180. In an exemplary aspect, the mounting structure comprises a threaded surface formed on an outer portion of backbone 116 that is configured to engage a corresponding threaded surface 184 of the boot 180 (see FIG. 6).

Also, the mounting structure 118 can provide a retention area for securing the strength members of the optical fiber cable being terminated.

In addition, the backbone can include a fiber guide 113 formed in an interior portion therein to provide axial alignment support for the optical fiber cable being terminated. In an exemplary aspect, the fiber guide portion 113 is a funnel-shaped channel or groove that aligns a buffered portion of the optical fiber and guides the fiber toward the mechanical splice device 140 housed in the collar body 120.

The backbone 116 also includes a collar body mount structure 115 configured to receive and secure the collar body 120 within the backbone. In a preferred aspect, collar body mount structure 115 comprises a rigid structure formed in an interior region of backbone 116 having an axial bore therethrough. The axial bore can be of appropriate size to receive and engage raised end structures 128 of collar body 120 (see FIG. 3). In addition, collar body mount structure 115 also forms a shoulder that can be used as a flange to provide resistance against spring 155 that is positioned over the second end portion 126 of the collar body 120. The spring 155 provides and maintains an adequate contact force when two connectors are joined together.

Backbone 116 can further include one or more stops 114 formed on an interior portion thereof to provide a boundary for the insertion of the jacketed portion 136 of the optical fiber cable 135 being terminated (as explained in more detail below). In addition, backbone 116 includes a clamping portion 119 formed at one an end of the backbone. The clamping portion 119 is configured to clamp onto the jacket portion 136 of the optical fiber cable 135 being terminated in connector 100. In a preferred aspect, clamping portion 119 comprises a collet-type, split body shape that is actuated when the boot is secured to mounting structure 118. The clamping portion 119 can include raised inner surfaces to permit ready clamping of the cable jacket portion 136. In an alternative aspect, the connector can also include an adapter tube to be placed over the cable jacket portion of the optical fiber cable, for example, when the optical fiber cable being clamped is of a smaller diameter. In addition, the clamping portion 119 also can provide a guide structure when inserting fiber cable 135 during the termination process. Thus, boot 180 can be utilized to clamp the fiber strength members 139 and the fiber jacket 136. The interaction of the boot 180 and the backbone 116 will be described in greater detail below.

According to an exemplary embodiment of the present invention, housing 110 and backbone 116 are formed or molded from a polymer material, although metal and other suitably rigid materials can also be utilized. Housing 110 is preferably secured to an outer surface of backbone 116 via snap fit (see e.g., outer engagement surface 111 shown in FIG. 5).

As mentioned above, connector 100 further includes a collar body 120 that is disposed within the connector housing and retained by the backbone. According to exemplary embodiments, the collar body 120 is a multi-purpose element that can house a ferrule 132 and optical fiber stub 134 and a mechanical splice device 140. The collar body is configured to have some limited axial movement within backbone 116. For example, the collar body 120 can include a collar or shoulder 125 that can be used as a flange to provide resistance against spring 155 (see FIGS. 2 and 3), interposed between the collar body and the backbone portion 115. According to an exemplary embodiment of the present invention, collar body 120 can be formed or molded from a polymer material, although metal and other suitable materials can also be utilized. For example, collar body 120 can comprise an injection-molded, integral material.

In particular, collar body 120 includes a first end portion 121 having an opening to receive and house a ferrule 132 having an optical fiber stub 134 secured therein. The collar body also includes a second end portion 126 configured to engage with the collar body mount structure 115 of backbone 116. In a preferred aspect, second end portion 126 has a raised structure portion 128 that has a sloping shape that is insertable through the bore of the collar body mount structure 115, as is shown in FIG. 3. Raised surfaces 128 of the second end portion can be inserted into the bore and engage against backbone mount structure 115 due to the bias of the spring 155.

The collar body 120 also secures the fiber stub and ferrule in place in the connector 100. Ferrule 132 can be formed from a ceramic, glass, plastic, or metal material to support the optical fiber stub 134 inserted and secured therein. In a preferred aspect, ferrule 132 is a ceramic ferrule.

An optical fiber stub 134 is inserted through the ferrule 132, such that a first fiber stub end slightly protrudes from or is coincident or coplanar with the end face of ferrule 132. Preferably, this first fiber stub end is factory polished (e.g., a flat or angle-polish, with or without bevels). A second end of the fiber stub 134 extends part-way into the interior of the connector 100 and is spliced to the fiber portion 138 of an optical fiber cable (such as optical fiber cable 135). Preferably, the second end of fiber stub 134 can be cleaved (flat or angled, with or without bevels).

In one aspect, the second end of fiber stub 134 can be polished in the factory to reduce the sharpness of the edge of the fiber, which can create scrapings (debris) as it is installed in the splice element. For example, an electrical arc, such as one provided by a conventional fusion splicer machine, can be utilized to melt the tip of the fiber and form a rounded end, thereby removing the sharp edges. This electrical arc technique can be used in conjunction with polishing by an abrasive material to better control end face shape while reducing possible distortion of the core. An alternative non-contact method utilizes laser energy to ablate/melt the tip of the fiber.

Fibers 134, 138 can comprise standard single mode or multimode optical fiber, such as SMF 28 (available from Corning Inc.). In an alternative embodiment, fiber stub 134 additionally includes a carbon coating disposed on the outer clad of the fiber to further protect the glass-based fiber. In an exemplary aspect, fiber stub 134 is pre-installed and secured (e.g., by epoxy or other adhesive) in ferrule 132, which is disposed in the first end portion 121 of collar body 120. Ferrule 132 is preferably secured within collar body first end portion 121 via an epoxy or other suitable adhesive. Preferably, pre-installation of the fiber stub can be performed in the factory.

Referring back to FIG. 4, collar body 120 further includes a splice element housing portion 123. In an exemplary aspect, splice element housing portion 123 provides an opening 122 in which a mechanical splice element 142 can be inserted and secured in the central cavity of collar body 120. In an exemplary embodiment, mechanical splice element 142 is part of a mechanical splice device (also referred to herein as a splice device or splice), such as a 3M™ FIBRLOK™ mechanical fiber optic splice device, available from 3M Company, of Saint Paul, Minn.

For example, commonly owned U.S. Pat. No. 5,159,653, incorporated herein by reference in its entirety, describes an optical fiber splice device (similar to a 3M™ FIBRLOK™ II mechanical fiber optic splice device) that includes a splice element that comprises a sheet of ductile material having a focus hinge that couples two legs, where each of the legs includes a fiber gripping channel (e.g., a V-type (or similar) groove) to optimize clamping forces for conventional glass optical fibers received therein. The ductile material, for example, can be aluminum or anodized aluminum. In addition, a conventional index matching fluid can be preloaded into the V-groove region of the splice element for improved optical connectivity within the splice element. In another aspect, no index matching fluid is utilized.

In this exemplary aspect, the splice element 142 can be configured similar to the splice element from a 3M™ FIBRLOK™ II mechanical fiber optic splice device or a 3M™ FIBRLOK™ 4×4 mechanical fiber optic splice device. Other conventional mechanical splice devices can also be utilized in accordance with alternative aspects of the present invention and are described in U.S. Pat. Nos. 4,824,197; 5,102,212; 5,138,681; and 5,155,787, each of which is incorporated by reference herein, in their entirety.

Mechanical splice element 142 allows a field technician to splice the second end of fiber stub 134 to a stripped fiber portion 138 of an optical fiber cable 135 at a field installation location. In an exemplary embodiment, utilizing a 3M™ FIBRLOK™ II mechanical fiber optic splice device, splice device 140 can include splice element 142 and an actuating cap 144 (FIG. 2). In operation, as the cap 144 is moved from an open position to a closed position (e.g. downward in the embodiment depicted in FIG. 2 or in the direction of arrow 107 in FIG. 7D), one or more cam bars located on an interior portion of the cap 144 can slide over the splice element legs, urging them toward one another. Two fiber ends, (e.g., one end of fiber stub 134 and one end of fiber 138 from optical fiber cable 135) are held in place in grooves formed in the splice element and butted against each other and are spliced together in a channel, such as a V-groove channel to provide sufficient optical connection, as the element legs are moved toward one another.

Splice element 142 is mountable in a mounting device or cradle 124 (partially shown in FIG. 4) located in portion 123 of collar body 120. In an exemplary embodiment, cradle 124 is integrally formed in collar body 120, e.g., by molding. Cradle 124 can secure (through e.g., snug or snap-fit) the axial and lateral position of the splice element 142. The mounting device 124 can be configured to hold the splice element such that the splice device cannot be rotated or easily moved forward or backward once installed.

The mechanical splice allows a field technician to splice the second end of fiber stub 134 to the fiber of an optical fiber cable 135 at a field installation location. The term "splice," as utilized herein, should not be construed in a limiting sense since splice device 140 can allow removal of a fiber. For example, the element can be "re-opened" after initial actuation, where the splice element housing portion can be configured to allow for the removal of the splice cap if so desired by a screw driver or similar device. This configuration permits repositioning of the spliced fibers, followed by replacement of the cap to the actuating position.

As mentioned above, fiber boot 180 can be utilized for several purposes with optical connector 100. As shown in FIG. 6, boot 180 includes a tapered body 182 having an axial bore throughout. The boot 180 includes threaded grooves 184 formed on an inner surface of the body 182 at the opening 185, where the grooves are configured to engage with the correspondingly threaded mounting structure 118 of the backbone 116. In addition, the axial length of boot 180 is configured such that a rear section 183 of the boot, which has a smaller opening than at front opening 185, engages the jacket clamp portion 119 of the backbone. For example, as is explained in more detail below, as the boot 180 is secured onto the mounting structure 118 of the backbone, the axial movement of the boot relative to the backbone (see arrow 105 in FIG. 7C) forces the legs of clamp portion 119 to move radially inwards so that the fiber jacket 136 is tightly gripped. Also, the strength members 139 of the optical fiber cable can be disposed between the boot and the threaded mounting structure 118 to secure the strength members as the boot is installed. This construction can also provide a connector termination capable of surviving rougher handling and greater pull forces.

In an exemplary aspect, boot 180 is formed from a rigid material. For example, one exemplary material can comprise a fiberglass reinforced polyphenylene sulfide compound material. In another aspect, the materials used to form the boot 180 and the backbone 116 are the same.

An exemplary fiber cable utilized in this embodiment comprises a 3.0 mm jacketed drop cable, commercially available from Samsung Cable, Thai-han Cable, and others (all of Korea). As would be understood by one of ordinary skill in the art given the present description, the optical connector of the exemplary embodiments can be configured to terminate the fibers of other types of jacketed drop cable, including 3.5 mm drop cable, and others.

As mentioned above, the optical fiber connector of the exemplary embodiments is of compact length and is capable of straightforward field termination without the use of a connector termination platform or separate crimping tool. An exemplary termination process is now described with reference to FIGS. 7A-7F. Please note that reference numbers used in these figures correspond with like features from FIGS. 1-6.

As shown in FIG. 7A, the optical fiber connector is partly assembled by inserting the collar body 120, with ferrule 132 secured therein, in the direction of arrow 104 into the opening 112 of the backbone 116. This step may be performed prior to the field termination process or during the field termination process. As mentioned above, the raised structure 128 of the collar body is inserted into the bore of structure 115. The spring 155 will provide some bias against axial movement after insertion.

Figure 7B:
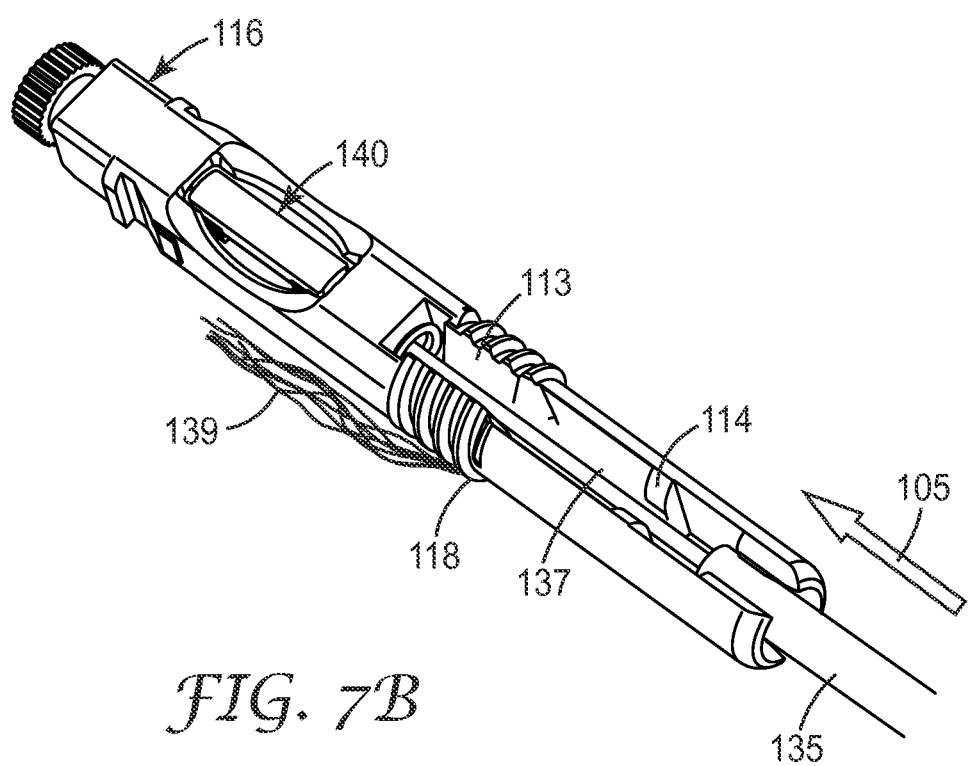
Figure 7C:
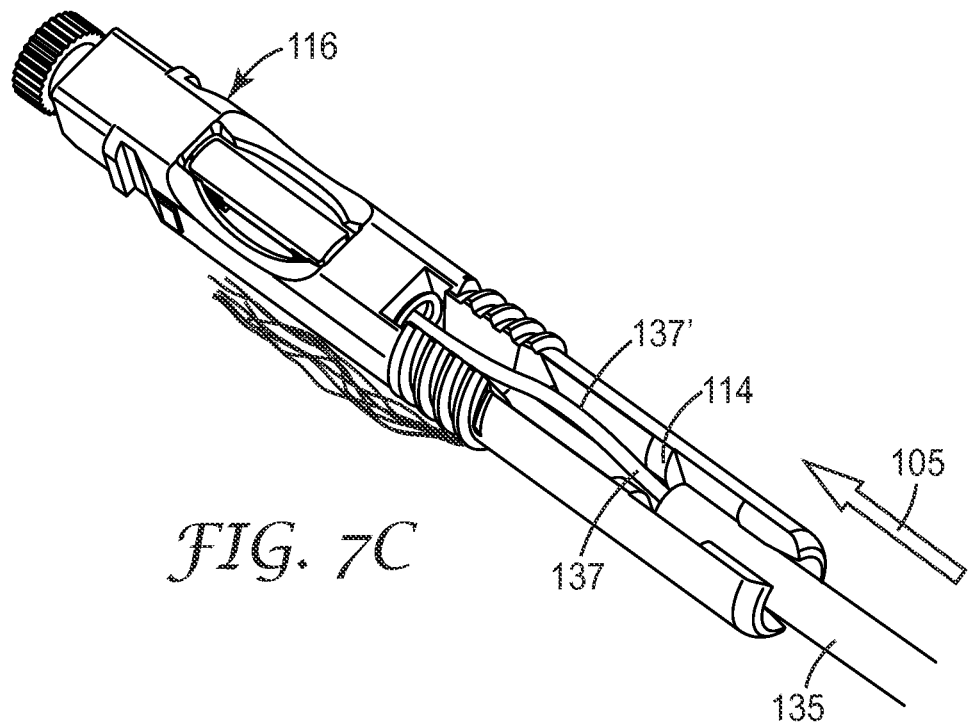

For field termination, optical fiber cable 135 is prepared by cutting of a portion of the fiber cable jacket 136 and stripping off a coated portion of the fiber near the terminating fiber end to leave a bare fiber portion 138 and cleaving (flat or angled) the fiber end to match the orientation of the pre-installed fiber stub. In an exemplary aspect, about 50 mm of the jacket 136 can be removed, leaving about 25 mm of stripped fiber. For example, a commercial fiber cleaver such as an Ilsintech MAX CI-01 or the Ilsintech MAX CI-08, available from Ilsintech, Korea (not shown) can be utilized to provide a flat or an angled cleave. No polishing of the fiber end is required, as a cleaved fiber can be optically coupled to the fiber stub 134 in the splice device. The boot 180 can be slid over the fiber cable 135 for later use. As shown in FIG. 7B, optical fiber cable 135 can be inserted in the direction of arrow 105 through the rear end of the connector (i.e., through the clamping portion 119 of the connector backbone). In this manner, the prepared fiber end can be spliced to the fiber stub with the mechanical splice device 140. The fiber cable 135 is continually inserted until the coated portion 137 of the fiber begins bowing at 137' (which occurs as the end of fiber 138 meets the fiber stub 134 with sufficient end loading force). In addition, FIG. 7C shows that the stops 114 formed on an interior portion of the backbone provide a boundary to stop further insertion of the jacketed portion 136 of the optical fiber cable 135.

Figure 7D:
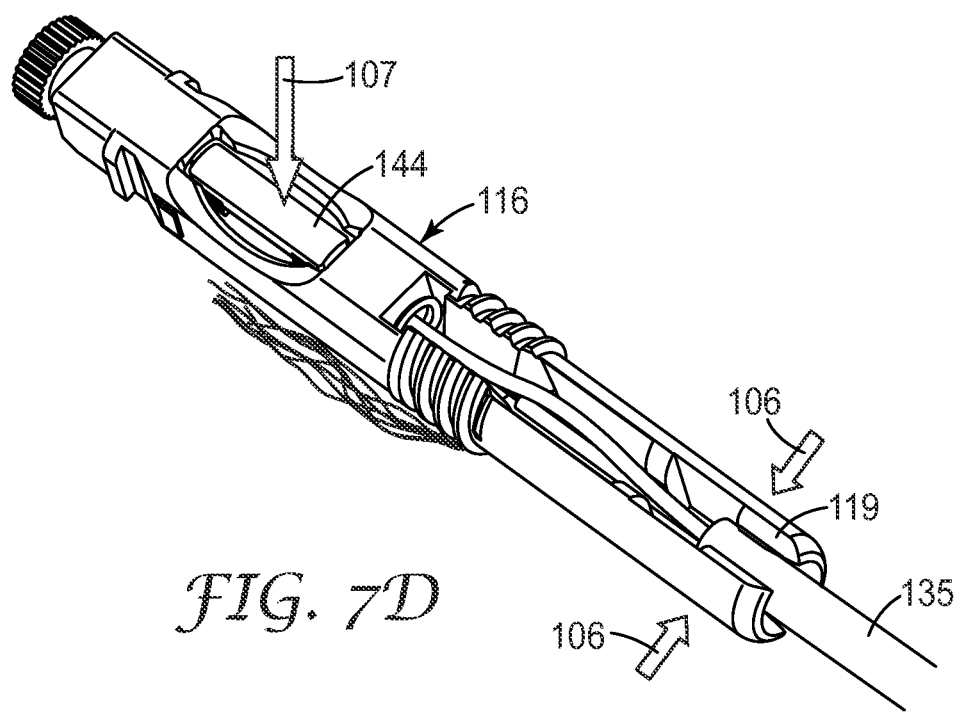

The splice device can then be actuated while the fibers are subject to an appropriate end loading force. To actuate the splice device, FIG. 7D shows that a user can simultaneously compress the jacket clamp portion 119 of the backbone by applying force in the direction of arrows 106 (with one hand) while pressing downward (with a modest thumb or finger force) in the direction of arrow 107 onto the cap 144 of the splicing device. The fiber jacket can then be released at clamping portion 119, thereby removing the fiber bow.

Figure 7E:
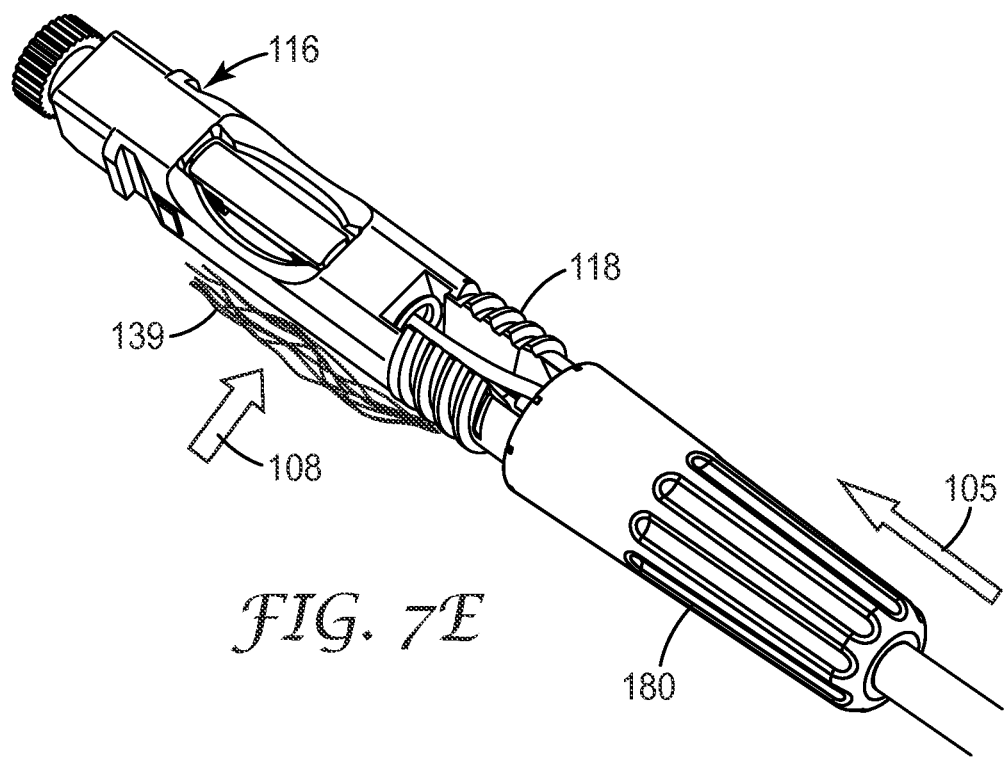
Figure 7F:
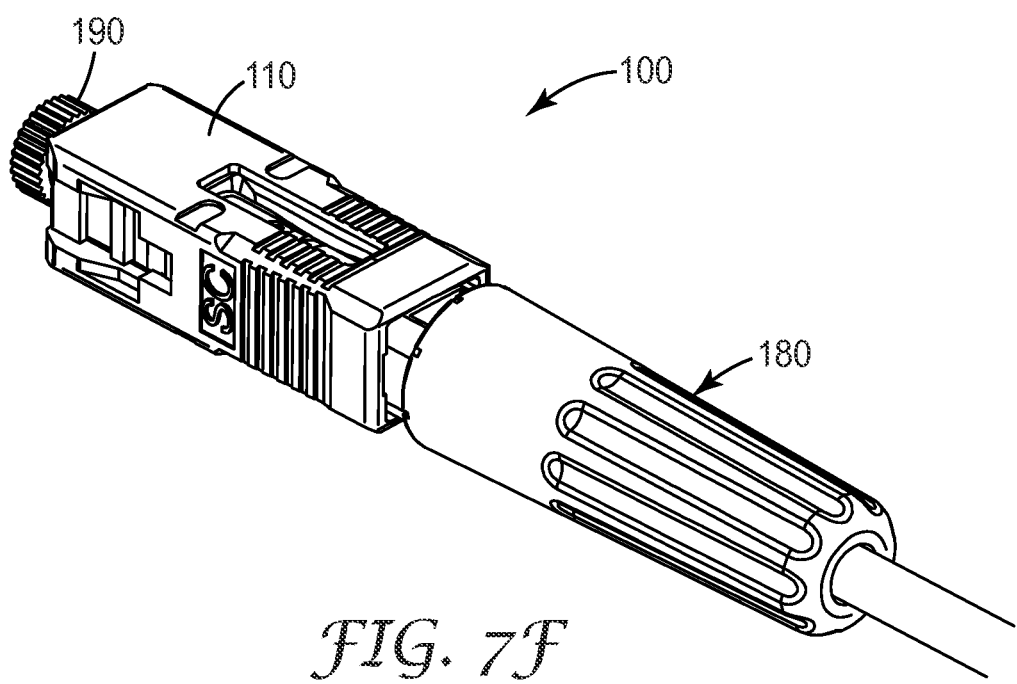

The boot 180 (which is previously placed over fiber cable 135) is then pushed onto the backbone 116. As is shown in FIG. 7E, the boot 180 can be pushed axially toward the backbone mounting section 118 and then screwed onto the backbone mounting section 118 to secure the boot 180 in place. As mentioned above, the installation of the boot 180 onto the backbone 116 tightens the collet-style clamping portion 119 onto the fiber jacket. During this installation, the user can hold the Kevlar strands 139 in place over the mounting structure 118 by application of a modest force (e.g., by thumb pressure) in the direction of arrow 108. After completion of the boot installation, the excess Kevlar can be removed (e.g., cut away). As shown in FIG. 7F, the installation can be completed by sliding the housing 110 onto the backbone.

Thus, the above termination procedure can be accomplished without the use of any additional fiber termination platform or specialized tool. The optical connector is re-usable in that the splice cap can be removed and the above steps can be repeated.

The optical connectors described above can be used in many conventional optical connector applications such as drop cables and/or jumpers. The optical connectors described above can also be utilized for termination (connectorization) of optical fibers for interconnection and cross connection in optical fiber networks inside a fiber distribution unit at an equipment room or a wall mount patch panel, inside pedestals, cross connect cabinets or closures or inside outlets in premises for optical fiber structured cabling applications. The optical connectors described above can also be used in termination of optical fiber in optical equipment. In addition, one or more of the optical connectors described above can be utilized in alternative applications.

As mentioned above, the optical connector of the exemplary embodiments is of compact length and is capable of straightforward field termination with reduced assembly times. Such exemplary connectors can be readily installed and utilized for FTTP and/or FTTX network installations.

Various modifications, equivalent processes, as well as numerous structures to which the present invention may be applicable will be readily apparent to those of skill in the art to which the present invention is directed upon review of the present specification.

We claim:
1. An optical fiber connector for terminating an optical fiber of an optical fiber cable, comprising:
   a backbone that provides structural support for the connector, the backbone including a jacket clamping portion to clamp a jacket portion of the optical fiber upon actuation and a thread mounting structure; and
   a boot attachable to a portion of the backbone, wherein the optical fiber cable comprises a jacket, a coated portion, a fiber portion and strength members and the strength members of the optical fiber cable are disposed between the boot and the threaded mounting structure onto which the boot is screwed, and wherein the boot actuates the jacket clamping portion of the backbone and secures the strength members upon attachment to the backbone.

2. The optical fiber connector of claim 1, further comprising a housing configured to mate with a receptacle, and a collar body disposed in the housing, wherein the backbone to retains the collar body within the housing.

3. The optical fiber connector of claim 2, wherein the collar body includes a fiber stub disposed in a first end portion of the collar body, the fiber stub including a first optical fiber mounted in a ferrule and having a first end proximate to an end face of the ferrule and a second end, wherein the collar body further includes a mechanical splice device disposed in a portion of the collar body, the mechanical splice device configured to splice the second end of the fiber stub to the fiber portion.

4. The optical fiber connector of claim 1, wherein the boot attaches to the backbone via a screw-type mechanism.

* * * * *